Oct. 3, 1967  B. E. OLSON  3,344,678
CHANGE SPEED MECHANISM
Filed Sept. 1, 1965  4 Sheets-Sheet 3
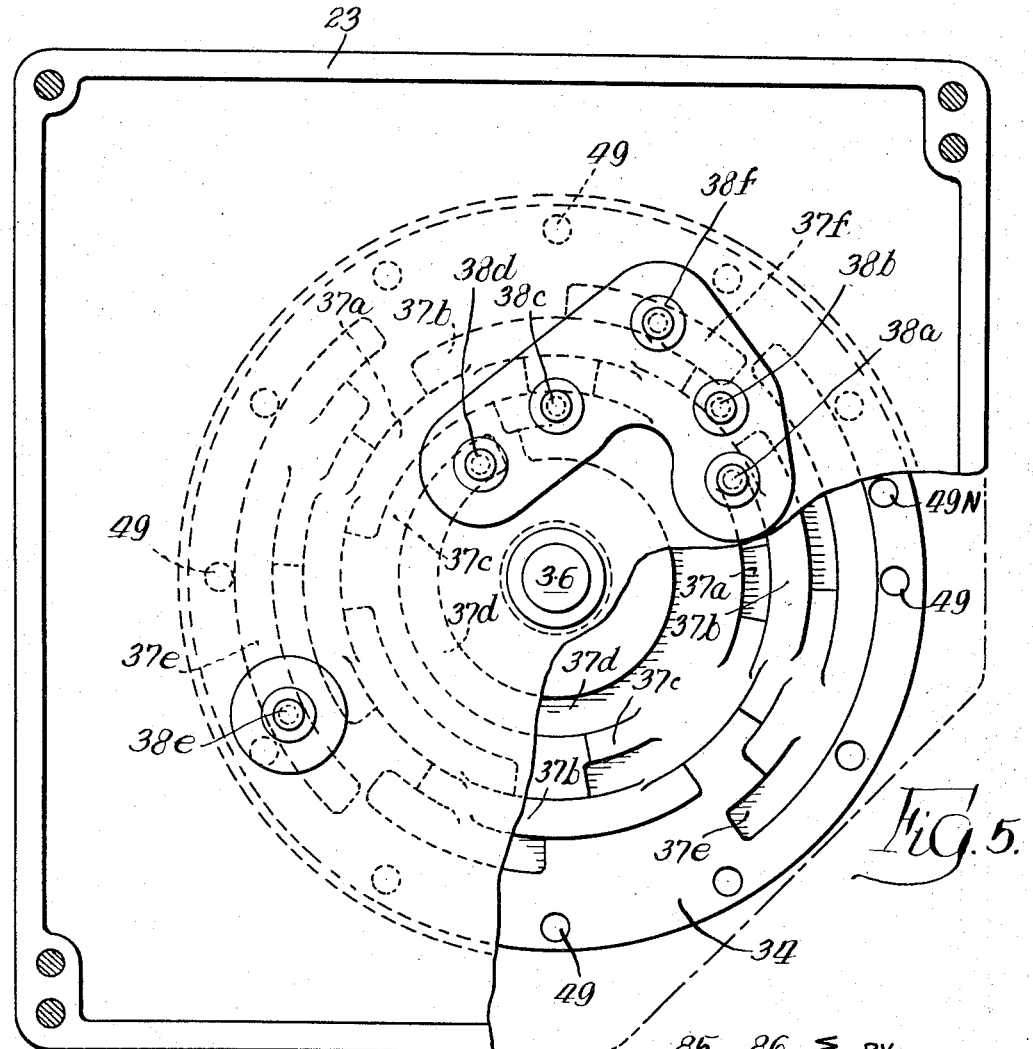
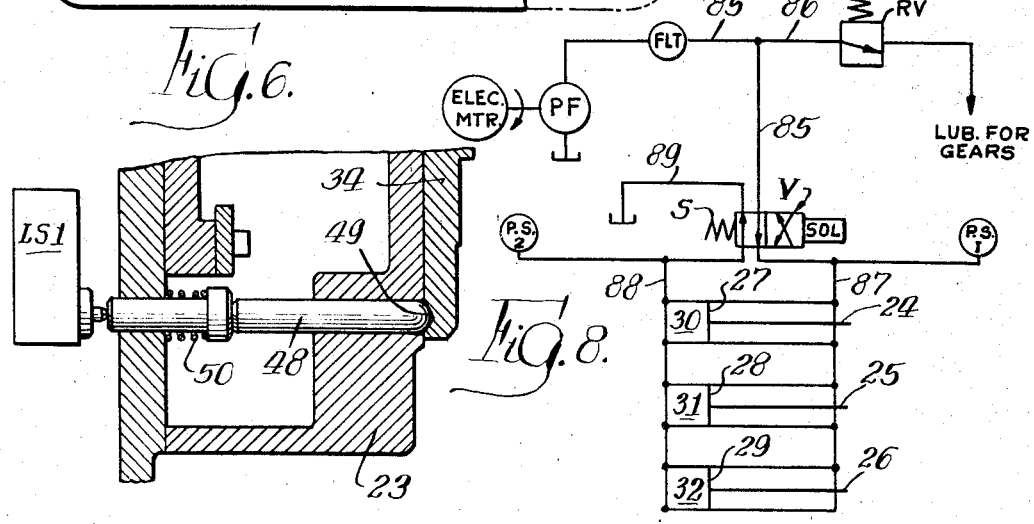

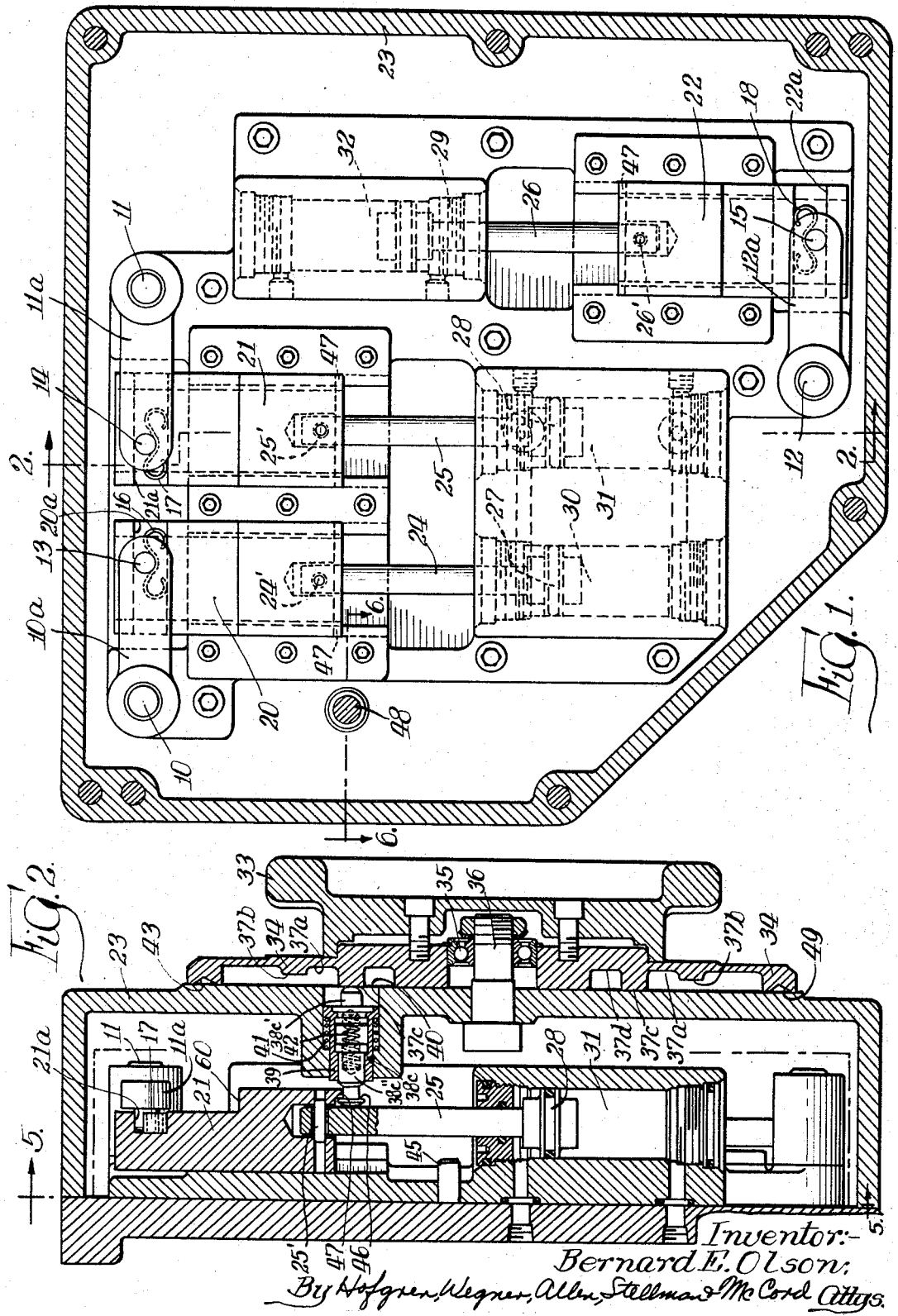

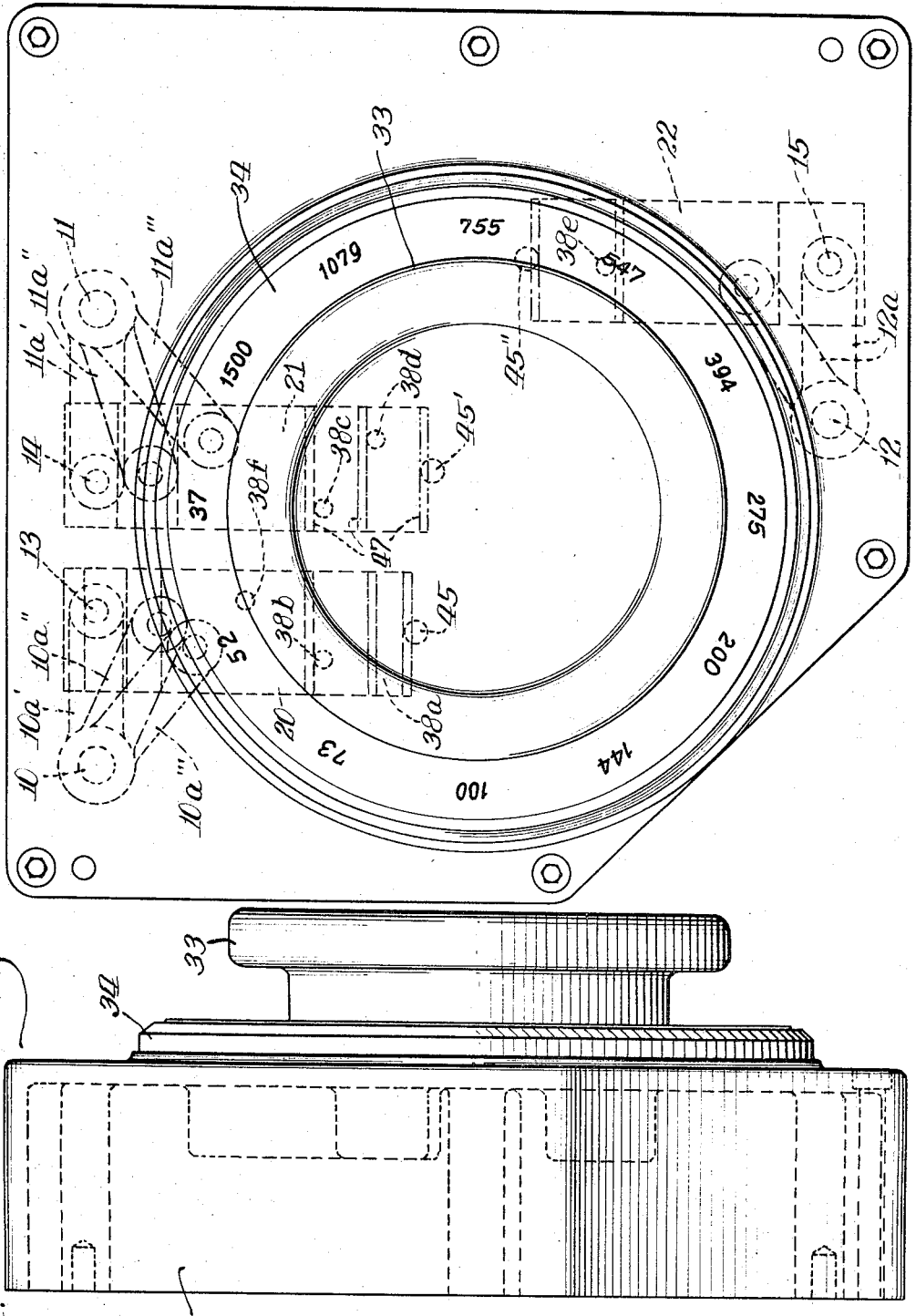

United States Patent Office 3,344,678
Patented Oct. 3, 1967

3,344,678
CHANGE SPEED MECHANISM
Bernard E. Olson, Loves Park, Ill., assignor to Rockford Machine Tool Co., a corporation of Illinois
Filed Sept. 1, 1965, Ser. No. 484,209
18 Claims. (Cl. 74—334)

This invention relates to a preselect change speed shifter assembly for a lathe headstock or the like.

It is a general object of this invention to provide a hydraulic preselect change speed mechanism for shifting the gears in a lathe headstock.

Another object is to provide a simple, efficient and compact mechanism of the type described wherein the gear ratio of a lathe can be preselected during one cutting operation for a subsequent cutting operation.

More particularly, this invention relates to a dial controlled headstock shifter assembly in which a dial has cam formations on a reverse face which operates to move stop plungers or pins through an adjacent casing wall into or out of positions to provide limit stops in the path of hydraulically operable members for shifting crank arms to change gears. The shifter assembly is capable of preselecting the gear ratios for a cutting operation of the lathe during a prior cutting operation, and operation of a main clutch and brake mechanism on the lathe will reset the shiftable members to the preselected gear ratio.

Other objects and advantages of the invention will be apparent from the following description taken in conjunction with the accompanying drawings in which:

FIG. 1 is a vertical sectional view through a headstock shifter assembly for a lathe or the like, embodying a preferred form of the invention, showing in front elevation the hydraulically shiftable members of this invention;

FIG. 2 is a sectional view taken generally along the line 2—2 of FIG. 1;

FIG. 3 is a front elevational view of the headstock shifter assembly of this invention, showing in broken lines the several positions of the gear shifting crank members;

FIG. 4 is a partial end elevation view of the casing, cam plate and selector dial of the shifter assembly of this invention;

FIG. 5 is a rear elevation view taken generally along the line 5—5 of FIG. 2, with the casing partially cut away to show the cam surfaces on the rear of the cam plate;

FIG. 6 is a partial sectional view taken generally along the line 6—6 of FIG. 1;

FIG. 8 is a schematic diagram of the hydraulic control means of this invention.

Figure 7:
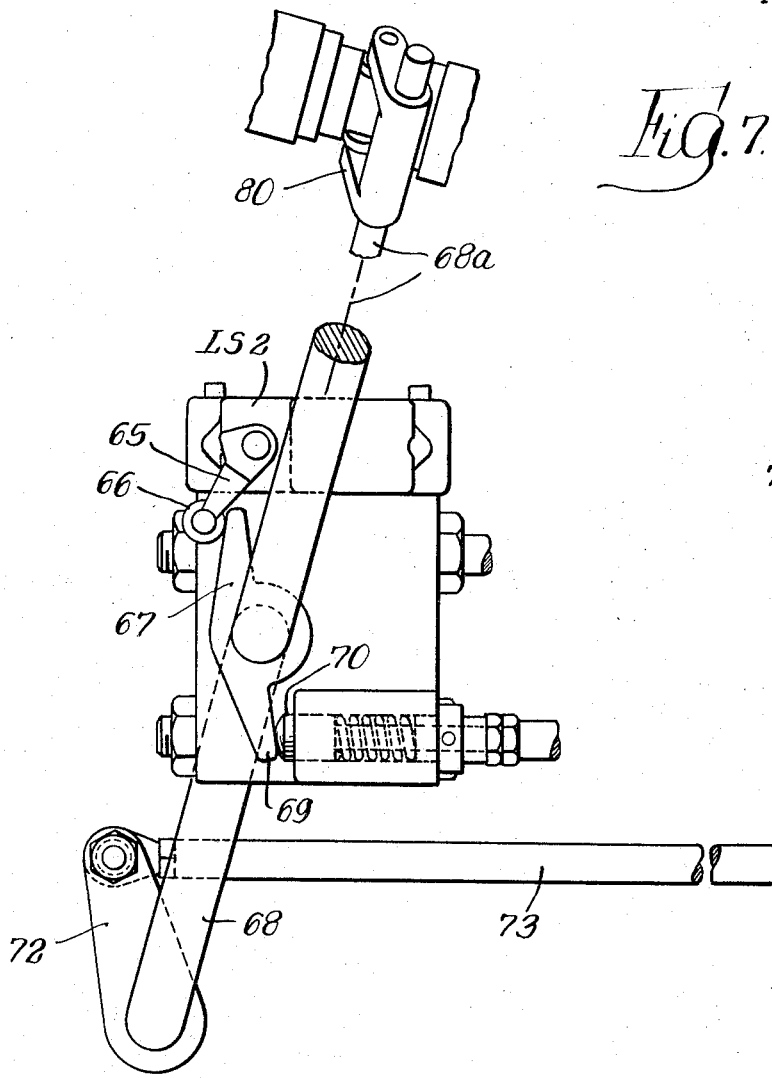
FIG. 7 is a horizontal view of a limit switch operation mechanism including a diagrammatic illustration of a main clutch and brake control.

While an illustrative embodiment of the invention is shown in the drawings and will be described in detail herein, the invention is susceptible of embodiments in many different forms, and it should be understood that the present disclosure is to be considered as an exemplification of the principles of the invention and is not intended to limit the invention to the embodiment illustrated. The scope of the invention will be pointed out in the appended claims.

In a preferred form, the invention is embodied in a hydraulic headstock shifter assembly for operating a gear change mechanism in the headstock of a lathe or the like. The actual change speed gears are not shown in the drawings as they may take any of various standard forms. In an actual installation, an appropriate part of the gear change mechnism of the lathe, such as a gear shifting fork, is connected to each of a plurality of gear shifting shafts 10, 11 and 12 mounted rotatably in a housing and arranged as shown in FIG. 1.

The gear shifting shafts are provided with crank arms 10a, 11a and 12a, the ends of which carry pins 13, 14 and 15 respectively. The crank arms are shiftable to various operable positions to rotate the shaft and change the gear ratios of the gear change mechanism. For example, it is contemplated that in the construction shown as indicated best in FIG. 3, the crank arms 10a and 11a are shiftable to three operable positions to rotate the shafts to three positions for the gear change mechanism. Similarly, the crank arm 12a is shiftable to two operable positions. In the intermediate position of the three position, crank arm 11a provides a gear disconnect, leaving the spindle free for manual manipulation if desired. Thus, twelve speeds are provided.

A hydraulic piston and cylinder power means is provided to move the crank arms to the various operative positions. As shown in FIGS. 1 and 2, the pins 13, 14 and 15 on the crank arms seat in curved leaf springs 16, 17 and 18 which are slidably carried in grooves 20a, 21a and 22a of slides 20, 21 and 22 respectively. The slides are mounted for vertical reciprocation within a housing 23 in a direction normal to one extreme operative position of the associated crank arm to oscillate the crank arm. The slides form a connecting means between the crank arms and piston and cylinder operator means. For such purpose, the slides are connected to the piston rods 24, 25 and 26 of piston 27, 28 and 29 respectively as by pins 24', 25' and 26'. The pistons operate in cylinders 30, 31 and 32 respectively to move the slides. As the pistons move in the cylinders, the slides move to swing the crank arms and rotate the gear shifting shafts to change the appropriate gear ratios of the lathe.

A rotatable cam plate is employed to move a plurality of plungers or limit stop pins in predetermined combinations through the casing wall and into or out of the path of the slides 20, 21 and 22, thus defining various operable angular positions for the gear shifting crank arms, and various gear ratios of the lathe. A manually accessible knob 33 is mounted on a cam plate 34 which is rotatably supported on the front wall of casing 23 by a bearing 35 and stud shaft 36. The left side of the cam plate, as seen in FIGS. 2 and 4, is provided with a plurality of concentric generally circular cam track surfaces 37a through 37f, FIG. 5, each of which is provided with a plurality of rises and falls which operate a plurality of plunger like stop pin assemblies, shown generally as 38a through 38f, one for each of the cam tracks 37a through 37f respectively. The raised portions of the cam tracks are designed to operate a suitable combination of stop pins to produce the desired lathe speed steps as enumerated, 37 r.p.m. through 1500 r.p.m. in FIG. 3. The stop pin assemblies are mounted on the casing 23 to the left of the cam plate 34, FIG. 2.

Each of the pin assemblies, as 38c, in FIG. 2, is comprised of a slidable bushing 39 which is crimped over the right portion of the stop pin (as at 38c', FIG. 2). The bushing and right portion of the stop pin are integrally slidably mounted within a counterbore 40 in the front wall of the casing. A spring 41 normally urges the bushing to the right to force the end portion of the pin against its cam track surface 37c. The left portion of the stop pin assembly (as at 38c'', FIG. 2) is slidably and resiliently mounted within the bushing 39. A spring 42 normally urges the left portion to the left in FIG. 2. As illustrated by the position of the parts in FIG. 2, the dial 33 has been rotated to a position where a rise on the cam track surface 37c has engaged the right portion of the stop pin 38c to force the stop pin assembly to the left compressing spring 41. As the bushing 39 slides to the left in the counterbore 40 the spring 42 urges the left portion 38c" of the stop pin to the left into the path of slide 20.

Should the slide be in a lower position than that shown in FIG. 2 when the stop pin assembly is initially actuated, so that the left portion 38c" of the pin comes in contact with the front face of the slide, the portion 38" is urged into the bushing 39, compressing spring 42. This enables such a pin to be preselectively positioned even though the slide is in a lower operating position, because spring 42 will force the left portion 38c" into the path of the slide when the slide is subsequently raised. It can be seen that the relative positions of the slides are governed by the relative positions of the cam surfaces as they press against the stop pin assemblies, and since the shafts determine the appropriate gear ratio for the lathe, the rotation of the cam plate 34 (which governs the relative position of the slides) selects the appropriate gear ratio for the lathe.

Referring to FIG. 3, it can be seen that the movable stop pin assembly 38b determines the upper extreme angular position 10a' for crank arm 10a, movable stop pin assembly 38a determines an intermediate position 10a", and a permanent stop pin 45 is provided to determine the lower extreme position 10a''' for crank arm 10a. Similar pins 38c, 38d and 45' determine three positions for crank arm 11a. Crank arm 12a has two positions determined by movable stop pin assembly 38e and permanent stop pin 45".

Pin 38f is provided in the path of an upper shoulder as at 60 on the slide 20 for purposes of holding the slide 20 against the pin 38a in the event that a successive speed selection does not require shifting of the crank arm 10a. More specifically, if a current speed selection has the slide 20 positioned against the pin 38a, and a subsequent speed preselection would require the slide in the same position, the pin 38f will be depressed into the path of the shoulder 60 to prevent withdrawal of the slide to its uppermost position and subsequent return to the same position from which it started. It will be understood that this avoids useless shifting of the gear controlled by shaft 10 when it is unnecessary. On the other hand, if the next preselected speed requires positioning of the slide 20 against the pin 38b, the cam pattern on the face of the disc 34 will leave the pin 38f undepressed, so that the slide may be retracted to its uppermost position for subsequent return to a position against the pin 38b If the slide 20 is positioned against the pin 45, depression of pin 38f will allow retraction of the slide 20 only to a height sufficient to engage with pin 38a.

In order to hold the shafts each in a preselected operable angular position while the cam is rotated to select a successive angular position, the left end of each of the stop pins is provided with an annular radially projecting flange 46, FIG. 2, which locks under a horizontal downwardly extending lip 47 on each slide. After a desired gear ratio has been selected and the lathe is in operation, a single control valve V, which controls the flow of hydraulic fluid to all three cylinders, is positioned as shown in FIG. 7, to apply pressure to the rod ends of the cylinders to normally urge the slides against the selected stop pins whereupon radial flanges 46 of the pins are locked behind the horizontal lips 47 of the slides. Since the pins are locked, the dial 33 can be rotated to rotate the cam plate 34 to preselect a desired gear ratio for a subsequent cutting operation without disturbing the already positioned stop pins.

Referring to FIG. 6, a detent pin 48 is provided and extends through the casing 23 so that the detent pin engages adjacent its periphery where the cam plate 34 is provided with a plurality of depressions 49, one for each of the twelve desired gear ratios enumerated as 37 r.p.m. through 1500 r.p.m. in FIG. 3. As the dial is turned, the detent pin is forced out of a depression compressing a spring 50 (to the left in the drawing) which normally urges a coaxial pin 61 (and pin 48) to the right. The movement of the pin 6 actuates a limit switch LS1 to condition a gear shifting circuit for subsequent gear change in response to the preselective adjustment of the cam, as described presently. Note that the turning of the cam knob preselects the gear ratio for the next cutting operation.

A depression 49N, seen at the right in FIG. 5, defines a thirteenth angular position of the cam if desired, by virtue of which slide 21 may be located against pin 38d to provide a disconnection in the gear train leaving the lathe spindle, and a limited amount of gearing, relatively unloaded and free for manual manipulation.

Upon reflection, it will be understandable that the three shafts, 10, 11 and 12, are adapted to control three shiftable gears in a conventional manner as by gear shifting forks carried on the shafts 10, 11 and 12, or other shafts associated with them, and terminating in free bifurcated ends with gear shifting pins or the like engaged in grooves on the gear bodies to be shifted. As described, the gear controlled by shaft 10 has three engaged positions, the gear controlled by shaft 11 has two engaged positions and one neutral position, and the gear controlled by shaft 12 has two engaged positions, so that twelve different speeds may be selected in order to select the various speed stops. The slides 20, 21 and 22, controlling shafts 10, 11 and 12, are adapted to assume linear positions corresponding to the operative angular positions of the shafts. The linear positions of the slides are controlled by the various stationary and movable stops described, including three stops for the slide 20, two stops for the slide 21 representing gear engaging positions for the shaft 11, and two stops for the slide 22. It will be understood that the depressible stop pin assemblies may be controlled in appropriate combinations of depressed and undepressed conditions representing various combinations of angular positions for the shafts 10, 11 and 12, in turn corresponding to various speed ratios. The positions of the depressible stop pins are in turn controlled by the cam tracks on the back face of the cam 34, and without going into detail to explain each cam fall and each cam rise in each cam track, it will be understandable to those skilled in the art that the cam tracks may be formed in a manner such that each of the angular positions of the cam will produce gear positions which provide the desired corresponding spindle speeds.

In operation, it is contemplated that upon the appropriate selection of a particular spindle speed and subsequent energization of a master clutch, the spindle will be rotated at the selected speed, during which an appropriate cut may be taken on the work. While such a cut is being taken, in contemplation of the succeeding cut, a different speed may be preselected by angular adjustment of the cam 34, at which time no present change in spindle speed occurs. Subsequently, when the current cut is completed, the master clutch in the drive is disengaged in order to permit the drive to come to a standstill for gear change. In order to bring the drive to a stop as rapidly as possible, a suitable braking means is usually provided. In order to appropriately control the master clutch and brake referred to, there is provided a readily accessible manually controllable handle movable in opposite directions from a neutral center position, in one direction to engage the clutch, and in the other direction to engage the brake. When the manual control handle is returned from the brake position to the neutral position, according to the present invention, the gear change takes place according to the preselected manipulation of the cam 34.

Referring to FIG. 7, there is an illustration of a limit switch LS2 which provides the gear change signal, together with a diagrammatic illustration of the manual control and the operating means for the master clutch and brake. The switch LS2 includes a pivotally mounted actuating arm 65 having a follower roller 66 at its free end adapted to engage a switch actuating arm 67 on a manually controllable shaft 68 appropriately mounted in the lathe headstock. Arm 67 is fixed on the shaft 68 and has an opposite extension 69 engaged by a spring-pressed plunger 70 adapted to normally maintain the shaft 68 in a neutral position.

In order to manually control the shaft 68, it includes an actuating arm 72 pivotally connected with a rod or link 73 in turn pivotally connected with an arm illustrated diagrammatically at 74 on a shaft 75 appropriately supported near the front of the lathe and carrying a manually accessible control handle 77. In the rearward or leftward position of the handle as illustrated, the shaft 68 is moved to a brake position. When the handle is positioned in the central upright position, the shaft 68 is positioned for neither clutching nor braking. When the handle 77 is moved forwardly, or to the right in FIG. 7, the shaft 68 is moved to a position where the master clutch is engaged.

In order to control the master clutch and brake, the shaft 68 extends longitudinally as illustrated diagrammatically at 68a to a position where it carries a shifter fork 80 movable in opposite directions from a neutral central position, to the left to the position shown in FIG. 7 for braking and to the right for clutching.

As the switch operating arm 67 on the shaft 68 moves from the neutral central position toward the left to the brake position illustrated, the switch arm 65 is moved to a position "cocking" the switch LS2 so that when the handle 77 is released for spring return to neutral, or manually returned to neutral, the arm 67 allows the switch arm 65 to actuate the limit switch LS2, initiating the change speed gear shifting.

Referring to the hydraulic circuit diagarm of FIG. 8, movement of the pistons 27, 28 and 29 in the cylinders 30, 31 and 32 is controlled by means including a fixed displacement pump designated PF driven by an electric motor "ELEC MTR" in order to deliver fluid under pressure through a filter FLT to a line 85 communicating with a solenoid valve V. A branch conduit 86 communicates with a relief valve RV for delivering excess fluid to a lubricating system. The valve V includes a suitable valve body and relatively movable valve member as illustrated diagrammatically, the latter normally biased by a spring S to a position as illustrated where the line 85 communicates with a line 87 which supplies fluid to the rod ends of the pistons 27, 28 and 29. At the same time, pressure fluid is delivered to a normally open pressure switch PS1 for a purpose which will appear. Fluid under pressure on the rod ends of the pistons has the effect of maintaining the slides controlled by the pistons with the abutment shoulders 47 against the appropriate stop pins.

In order to retract the slides; to allow gear changes, valve V includes a solenoid SOL for moving the associated valve member to a position in which fluid is ported from the line 85 to a line 88 pressurizing the opposite ends of the cylinders, while the rod ends communicate with tank as at 89. At the same time, a normally closed pressure switch PS2 will be pressurized for a purpose that will appear.

Figure 9:
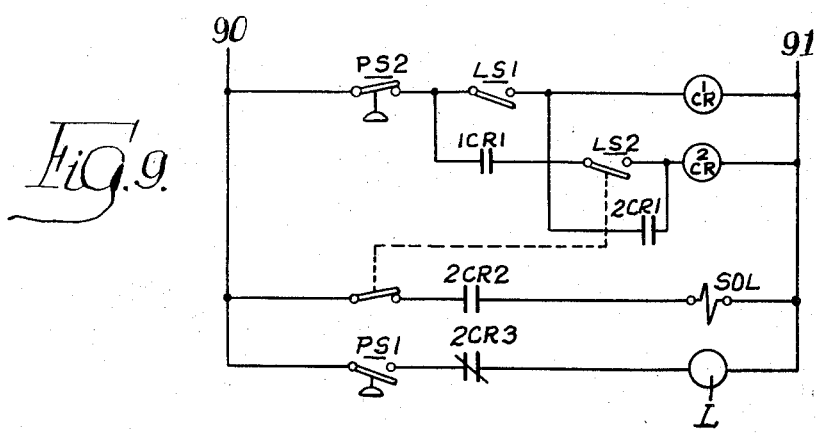
FIG. 9 is a wiring diagram.

Referring now to the wiring diagram of FIG. 9, a suitable source of voltage is applied across lines 90 and 91 for a control circuit which, it will be noted, includes limit switches LS1 and LS2, pressure switches PS1 and PS2, the solenoid SOL for the valve V, as well as control relay coils 1CR and 2CR together with the contacts normally open 1CR1 controlled by coil 1CR and contacts normally open 2CR1, normally open 2CR2 and normally closed 2CR3 controlled by coil 2CR and a lamp L.

In operation, with the drive gearing functioning to rotate the lathe spindle in the headstock at some predetermined speed for the purpose of making a predetermined cut, the parts in the hydraulic circuit of FIG. 8 and the parts in the wiring diagram of FIG. 9 are all positioned substantially as illustrated. During such cut, the operator handling the lathe, in contemplation of the succeeding cut which may require a different spindle speed, may turn the manually accessible knob 33 with the cam 34 to a different angular position. At the time this occurs, no visible effect is produced. However, as described hereinabove, a different arrangement of slide stop pins is actuated, bearing in mind that if the slides are in the path of the pins, the spring 42 yields pending retraction of the slides whereupon the actuation pin ends 38c″ are projected into the path of the slides before the return movement thereof. The pins currently controlling the slides are not retracted upon adjustment of the cam because of the interlock between the shoulder or lip 47 on the slides and the flanged end 46 of the pin.

Such angular adjustment of the control cam at least in the initial portion of the movement disengages one of the detent recesses 49 from the pin 48, and the raised face on the back of the dial adjacent the periphery forces the plunger 48 and the coaxial plunger inwardly against the biasing of spring 50 to a position actuating limit switch LS1 until such time as the pin 48 comes to rest again in another detent recess 49. The limit switch LS1 is thus closed at least momentarily at a time when the normally closed pressure switch PS2 (FIG. 9) is closed, thereby energizing the coil 1CR. Energization of the coil 1CR has the effect of closing normally open contacts 1CR1 providing a holding circuit for the coil around LS1 so that the coil remains energized after the dial is set. Now, when the current cut is completed, the operator normally stops the spindle as by moving the handle 77 from the clutch position to the neutral position, and through the netural position to the brake position until such time as the spindle comes to rest. Release of the handle at this time allows spring return of the handle to neutral by the plunger 70. At the same time, return movement of the lever arm 67 toward neutral releases the cocked switch actuating arm 65 to operate the limit switch LS2 at least momentarily, energizing coil 2CR. Energization of the coil 2CR closes its normally open contacts 2CR1 and 2CR2 and opens its normally closed contacts 2CR3. Closure of the contacts 2CR1 establishes a holding circuit around LS2 for the coil 2CR.

When the arm 67 has returned to the neutral position, LS2 opens, and the second set of contacts LS2–2 controlled thereby returns to a normally closed position completing a circuit to the solenoid SOL. As explained previously, energization of the solenoid positions the valve V to retract the slides, allowing the previously utilized stop pins to return to normal positions unless it happens that one or more is also used in the new setting.

Energization of the solenoid valve as described relieves the pressure from PS1 allowing it to open and applies pressure to PS2 opening it. The last mentioned action deenergizes the coil 1CR, opening contacts 1CR1 and deenergizing the coil 2CR, which opens contacts 2CR2, deenergizing the solenoid of the valve to permit return of the latter to the normal position. Return of the valve to the normal position again pressurizes the switch PS1 so that a circuit is completed through the now closed contacts 2CR3 energizing a lamp L, which indicates to the operator that the gear change has been completed so that he may again move the control handle 77 to a clutch position starting spindle operation at the new preselected speed.

Thus it can be seen that I have provided a simple, efficient and compact hydraulic mechanism for shifting the gears in a lathe or the like, a mechanism permitting preselection of a desired gear ratio for a succeeding cutting operation of the lathe during a preceding cutting operation thereof, by the use of a dial operated circular cam having concentric cam track surfaces thereon which provide a plurality of rises and falls for the selection of appropriate stops. The appropriate stops govern the hydraulic mechanism and thus the desired speed of the lathe. The mechanism is simplified by the provision of a single valve for controlling all of the gear shifting piston and cylinder devices, particularly with the provision of a plurality of two-position and three-position gear shifting members controlled by selectively positionable stops which facilitate the selection of three-positions under control of a simple double-acting piston and cylinder device which normally could only provide one, or at most two, positions.

I claim:

1. In a change speed gear control, a control housing, a disc rotatably mounted on the housing and having a cam face including a plurality of concentrically arranged cam tracks each having at least one cam rise and one cam fall, a plurality of plungers mounted on the housing in positions adjacent the cam tracks, each plunger having at one end a cam follower head engageable with an adjacent cam track, means biasing the plungers toward the cam tracks so that upon rotation of the disc the rises and falls in the cam tracks reciprocate the plungers between projected and retracted positions, means at the opposite ends of the plungers providing control surfaces thereon, and yieldable detent means on the housing and the disc defining predetemined angular disc positions, the construction and arrangement of the cam tracks being such that for each predetermined angular disc position, the plungers assume predetermined projected or retracted positions.

2. In a change speed gear control, a housing, a manually operable disc rotatably mounted on the outside of one wall of the housing and having a cam face adjacent the housing including a plurality of cam tracks concentric about the axis of disc rotation, each having cam rises and falls, a plurality of plungers mounted on said housing wall in angularly spaced positions adjacent the cam tracks, at least one plunger for each cam track, each plunger having at one end a cam follower head engageable with an associated cam track, means biasing the plungers toward the cam tracks so that upon rotation of the disc the rises and falls in the cam tracks cause reciprocation of the plungers between projected and retracted positions respectively, means on the opposite ends of the plungers providing stops when the plungers are projected, the construction and arrangement of the cam tracks being such that for each of a plurality of predetermined angular positions of the discs, the plungers are projected or retracted in one of a plurality of combinations of projected and retracted positions.

3. In a change speed gear control as defined in claim 2, a switch means mounted on the housing adjacent the disc, and means on the disc for operating the switch means on rotation of the disc from one predetermined angular position to another.

4. In a change speed gear control as defined in claim 2, a stop pin reciprocable on each plunger and providing said stops, and spring means on each plunger biasing each stop pin toward a projected position, so that the plunger may be projected when the path of projection of the stop pin is obstructed, and when the path of the pin is subsequently unobstructed the stop pin will automatically project.

5. In a change speed gear control as defined in claim 4, a plurality of slides mounted on the housing to move back and forth in laterally spaced paths each transverse to the path of movement of at least one stop pin in projected position, so that the latter in projected position acts as a stop for the associated slide, defining a position for the slide, and a plurality of said plungers and associated stop pins along the path of at least one of said slides for selectively defining a plurality of positions for said one slide.

6. In a change speed spindle drive for a lathe headstock, a plurality of gear shifter arms mounted for movement between retracted and extended positions for shifting gear elements between inoperative and operative positions, a plurality of piston and cylinder devices, means connecting the piston and cylinder devices respectively for moving the arms, fixed stops respectively in the path of movement of the connecting means defining extended positions of the arms, at least one selectively positionable stop movable into the path of at least one of said connecting means for defining an additional extended position for at least one arm, and means providing a source of fluid under pressure for operating the piston and cylinder device.

7. In a change speed spindle drive for a lathe headstock as defined in claim 6, at least two selectively positionable stops movable into the path of at least one other of said connecting means for defining two additional extended positions for one other arms, means for selectively controlling the positions of the movable stops relative to the path of movement of the connecting means to select a spindle speed, and a selectively operable valve movable to one position for porting fluid under pressure to one end of each cylinder to move the arms in one direction to retracted positions away from the stops and movable to another position for porting fluid under pressure to the opposite end of each cylinder for moving the arms to extended positions against selected stops.

8. A preselect change speed shifter assembly for a lathe headstock or the like, comprising: a housing; a plurality of gear shifting members mounted rotatably on said housing; means to shift said members to various operable angular positions, said means comprising a crank arm for each member, a slide connected to each crank arm for reciprocating movement in said housing in a direction to move said crank arm, and a piston, rod and cylinder means to move each slide, said rod being connected to and movable in the direction of reciprocating movement of said slide; means for selecting said various angular positions; and means to hold said gear shifting members each in a selected operable angular position while said selecting means is operated to preselect a successive angular position for each slide.

9. A preselect change speed shifter assembly as defined in claim 8, including means connecting each crank arm to a slide comprising a pin on each crank arm, a slot in the associated slide transverse to the direction of slide movement, and a spring member resiliently slidable in each slot and carrying the associated crank pin.

10. A change speed shifter assembly for a lathe headstock or the like, comprising: a housing having a wall; a plurality of gear shifting members mounted rotatably in said housing; power means to move said gear shifting members between extreme positions; a plurality of stop pins mounted on said wall and movable into and out of the path of said power means to stop said power means at intermediate positions; a circular rotatable cam mounted on said forward wall and having concentric cam surfaces comprised of a plurality of rises and falls for engaging said stop pins to actuate predetermined pins to determined said intermediate positions and a gear ratio.

11. The change speed shifter assembly of claim 10 including means to hold said actuated stop pins in the path of said power means while said cam is rotated to another position to actuate predetermined pins to preselect a successive gear ratio.

12. A preselect change speed shifter assembly for a lathe headstock or the like, comprising: a housing having a wall; a plurality of gear shifting shafts mounted rotatably on said housing; a crank arm on each of said shafts; means to shift each crank arm to various operable positions comprising a slide connected to each crank arm for reciprocating movement in a direction to oscillate said crank arm, and a piston, rod and cylinder means to move each slide, said rod being connected to and movable in the direction of the reciprocating movement of said slide; means for normally applying fluid under pressure to one end of each piston to urge said crank arms to extended positions; a plurality of stop pins mounted on said forward wall and movable into and out of the path of said slides; spring means for normally urging said stop pins out of the path of said slides; means for moving various stop pins against said springs into the path of said slides for selecting said extended positions and a gear ratio; means to hold said various stop pins in engagement with said slides while said moving means is adjusted to preselect a successive gear ratio; and means for directing fluid under pressure to the opposite end of said cylinder to release said various pins and move said slides and said crank arms to retracted positions.

13. A preselect change speed shifter assembly as in claim 12 wherein said moving means comprises, a circular rotatable cam mounted on said wall and having concentric cam track surfaces comprised of a plurality of rises and falls for engaging said stop pins to operate said pins to determine said extended positions for said crank arms.

14. A preselect change speed shifter as in claim 12 wherein said holding means comprises a flange on each slide extending in a direction transverse to the movement of said stop pins and a radial projection of one end of each stop pin for locking behind said flange.

15. A preselect change speed shifter assembly for a lathe headstock or the like, comprising: a housing having an outside wall; three gear shifting shafts mounted rotatably on said housing extending generally transversely to said wall, and being rotatable to different operable positions; a crank arm on each of said shafts for rotating said shafts; means for rotating said crank arms to various operable positions including three slides, one connected to each crank arm for reciprocating movement in a direction to oscillate said crank arm and a piston and cylinder device to move each slide including a piston rod connected to and movable in the direction of the reciprocating movement of said slide; means for normally applying fluid under pressure to one end of each of said pistons to urge said slides in one direction toward extended positions; a stop pin movable into the path of one of said slides for determining a first extended position for said slide, a second stop pin movable into position for determining a second intermediate extended position for said first slide, and a fixed pin positioned for determining a third extreme extended position for said slide; similar pins for determining extended positions for a second of said slides; a movable and a fixed pin for determining two extended positions for the third of said slides; a circular rotatable cam formation mounted on said housing wall and having concentric cam track surfaces comprised of a plurality of rises and falls for engaging said movable stop pins for selectively operating said pins to determine the angular positions of said gear shifting shafts in predetermined combinations; means to hold said stop pins in engagement with said slides while said cam formation is rotated to another position where the pins may be preselectively operated to preselect a successive position for said crank arms; and means for reversing the flow of fluid to the opposite ends of said cylinders to release said held pins and to rotate said crank arms away from the previously effective pins and to withdrawn positions preparatory to reverse movement of the crank arms to said predetermined operable positions.

16. In a change speed spindle drive for a lathe headstock, a plurality of gear shifter arms mounted for movement between retracted and extended positions for shifting gear elements between inoperative and operative positions, a plurality of piston and cylinder devices, means connecting the piston and cylinder devices respectively for moving the arms, a plurality of stops movable selectively between retracted positions out of the path of said connecting means and extended positions in the path of the connecting means for defining extended positions for the arms, manually positionable cam means controlling the positions of the stops, means providing a source of fluid under pressure for operating the piston and cylinder devices, selectively operable valve means for porting fluid under pressure to one end of each cylinder to move the arms in one direction to retracted positions away from the stops or to the opposite end of each cylinder for moving the arms to extended positions against selected stops, first switch means operated by said cam means on operation thereof, manually operable drive control means movable in opposite directions from "neutral position respectively to "clutch" and "brake" positions, second switch means responsive to movement of said manually operable means from "brake" position to "neutral" position, and means for moving said valve means responsive to operation of both switch means to port fluid to retract the arms.

17. In a change speed spindle drive for a lathe headstock as defined in claim 16, means to hold extended stops in engagement with said slides while said cam means is adjusted to preselect another spindle speed, so that a succeeding spindle speed may be preselected while the drive is operating at a preceding selected spindle speed and the speed will be changed only upon movement of the manually operable drive control means from "brake" position to "neutral" position.

18. In a change speed spindle drive for a lathe headstock as defined in claim 17, yieldable means on each stop compressible upon preselective adjustment of said cam means in the event the path of the stop is obstructed, and expansible when the path is subsequently unobstructed as upon retraction of said arms.

References Cited

UNITED STATES PATENTS

| | | | |
|---|---|---|---|
| 2,429,160 | 10/1947 | Helmstein et al. | 74—334 |
| 2,873,613 | 2/1959 | Schulte et al. | 74—334 |
| 2,896,462 | 7/1959 | Mottu | 74—334 |
| 3,117,658 | 1/1964 | Hoelscher et al. | 74—334 |

DONLEY J. STOCKING, *Primary Examiner.*

H. S. LAYTON, *Assistant Examiner.*